(12) United States Patent
Han et al.

(10) Patent No.: US 10,462,157 B2
(45) Date of Patent: Oct. 29, 2019

(54) MULTI-PATTERN MATCHING ALGORITHM AND PROCESSING APPARATUS USING THE SAME

(71) Applicant: Korea Advanced Institute of Science And Technology, Daejeon (KR)

(72) Inventors: Dong-Su Han, Daejeon (KR); Byung-Kwon Choi, Daejeon (KR); Jae-Hyun Nam, Daejeon (KR); Muhammad Jamshed, Daejeon (KR); Kyoung-Soo Park, Daejeon (KR); Jong-Wook Chae, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 898 days.

(21) Appl. No.: 15/008,966

(22) Filed: Jan. 28, 2016

(65) Prior Publication Data

US 2016/0239748 A1     Aug. 18, 2016

(30) Foreign Application Priority Data

Apr. 2, 2015   (KR) ........................ 10-2015-0046640

(51) Int. Cl.
| | | |
|---|---|---|
| *G06K 9/00* | (2006.01) | |
| *G06N 5/04* | (2006.01) | |
| *H04L 29/06* | (2006.01) | |
| *G06K 9/68* | (2006.01) | |

(52) U.S. Cl.
CPC ........ *H04L 63/1416* (2013.01); *G06K 9/6878* (2013.01); *G06N 5/04* (2013.01)

(58) Field of Classification Search
CPC ..... H04L 63/1416; G06K 9/6878; G06N 5/04
See application file for complete search history.

(56) References Cited

U.S. PATENT DOCUMENTS 8,250,016 B2 *   8/2012   Hua ........................ G06K 9/62
706/45

OTHER PUBLICATIONS

Dharmapurikar, Sarang, and John W. Lockwood. "Fast and scalable pattern matching for network intrusion detection systems." IEEE Journal on Selected Areas in communications 24.10 (2006): 1781-1792. (Year: 2006).*
Hua, Nan, Haoyu Song, and T. V. Lakshman. "Variable-stride multi-pattern matching for scalable deep packet inspection." INFOCOM 2009, IEEE. IEEE, 2009. (Year: 2009).*

* cited by examiner

*Primary Examiner* — Eric Nilsson
(74) *Attorney, Agent, or Firm* — Foley & Lardner LLP

(57) ABSTRACT

A multi-pattern matching algorithm may be provided that includes: a moving step of moving a moving window from the start of a string one byte by one byte; a DF1 checking step of converting the string on a current position of the moving window into an integer value, and of checking whether or not a bit of a related position in a first direct filter DF1 for patterns having lengths larger than 2 bytes is set to 1; a DF moving step of checking one or more direct filters DF when the bit is set to 1 according to the DF1 checking step; a re-moving step of moving the moving window by one byte again when the bit of a related position in the direct filter DF, which has been checked lastly, is 0; and a terminating step of checking whether the moving window is located at the end of the string or not, and of terminating the algorithm when the moving window is positioned at the end of the string.

13 Claims, 9 Drawing Sheets

<DIRECT FILTER>

| <PID> | <PATTERN> | <LENGTH> |
|---|---|---|
| 1001 | "UP" | 2Byte |
| 1002 | "ATTACK" | 6Byte |
| 1003 | "BOMB" | 4Byte |
| 1004 | "EXPLOSION" | 9Byte |

<CT2>

<CT3>

| <PID> | <PATTERN> | <LENGTH> |
|---|---|---|
| 1001 | "ZZ" | 2Byte |
| 1002 | "AABB" | 4Byte |
| 1003 | "AABBCCDD" | 8Byte |
| 1004 | "AAAABBBB" | 8Byte |
| 1005 | "CCCCBBBB" | 8Byte |
| 1006 | "JJJJKKDD" | 8Byte |
| 1007 | "AABBDDDD" | 8Byte |
| 1008 | "AABBBBBB" | 8Byte |

MULTI-PATTERN MATCHING ALGORITHM AND PROCESSING APPARATUS USING THE SAME

BACKGROUND

Field

The present invention relates to a multi-pattern matching algorithm and a processing apparatus using the same, and more particularly to a multi-pattern matching algorithm using a direct filter and a compact table and a processing apparatus using the same.

Description of Related Art

A multi-pattern matching relates to how to find whether at least one pattern in a string exists or not. In the past, in order to solve a multi-pattern matching problem, the existence of the pattern was, as shown in FIG. 12, checked by searching a string for each pattern once. However, in this method, the string should be searched as many as the number of the patterns of which the existence is to be checked, so that the performance of the method becomes slower.

Therefore, for the purpose of overcoming such a problem, a multi-pattern matching algorithm has been researched which is capable of checking whether all of the patterns exist or not by only onetime string search, regardless of the number of the patterns.

In general, a single pattern matching algorithm has a time complexity of O (m+zn) for solving the multi-pattern matching problem (here, m: sum of the lengths of all of the patterns, z: the number of the patterns, n: the length of the string). Contrarily, Aho-Corasick algorithm that is one of conventional algorithms has a time complexity of O (m+n+k) (k: the number for which the pattern is formed in the string).

Referring to FIG. 13, in the Aho-Corasick algorithm uses a structure having a failure link and an output link added to a keyword tree including the patterns. Through use of this, the Aho-Corasick algorithm is able to determine whether all of the patterns in the keyword tree exist or not by only one time string search.

However, the Aho-Corasick algorithm has a problem that the size of a tree used for searching in the Aho-Corasick algorithm rapidly increases with the increase of the number of the patterns. Therefore, due to the features of the tree structure, a lot of cache misses occur during the searching by using the Aho-Corasick algorithm. Generally, a lot of cache misses are directly related to the performance degradation.

Accordingly, it is necessary to research a multi-pattern matching algorithm capable of reducing the occurrence of the cache miss and a processing apparatus using the same.

SUMMARY

One embodiment is a multi-pattern matching algorithm is provided that includes: a moving step of moving a moving window from the start of a string one byte by one byte; a DF1 checking step of converting the string on a current position of the moving window into an integer value, and of checking whether or not a bit of a related position in a first direct filter DF1 for patterns having lengths larger than 2 bytes is set to 1; a DF moving step of checking one or more direct filters DF when the bit is set to 1 according to the DF1 checking step; a re-moving step of moving the moving window by one byte again when the bit of a related position in the direct filter DF, which has been checked lastly, is 0; and a terminating step of checking whether the moving window is located at the end of the string or not, and of terminating the algorithm when the moving window is positioned at the end of the string.

Here, the multi-pattern matching algorithm may further include, after the DF moving step, a DF4 checking step of checking whether or not a bit of a related position in a fourth direct filter DF4 for patterns having lengths larger than 2 bytes and less than 4 bytes is set to 1.

Here, the multi-pattern matching algorithm may further include, after the DF4 checking step, a PID recording step of, when the bit of a related position in the fourth direct filter DF4 is set to 1, recording a pattern ID (PID) corresponding to the string in which the moving window is located, with reference to a first compact table CT1 storing PIDs of the patterns having lengths larger than 2 bytes and less than 4 bytes.

Here, the multi-pattern matching algorithm may further include, after the DF moving step, a DF2 checking step of moving the moving window by two bytes from the current position, of converting the string of a length as much as 2 bytes on the moved position into an integer value, and of checking whether or not a bit of a related position in a second direct filter DF2 for patterns having lengths larger than 4 bytes is set to 1.

Here, the multi-pattern matching algorithm may further include, after the DF2 checking step, a DF5 checking step of, when the bit of a related position in the second direct filter DF2 is 1, checking whether or not a bit of a related position in a fifth direct filter DF5 for patterns having lengths larger than 4 bytes and less than 8 bytes is set to 1.

Here, the multi-pattern matching algorithm may further include, after the DF5 checking step, a PID recording step of, when the bit of a related position in the fifth direct filter DF5 is 1, checking whether or not a pattern ID (PID) corresponding to the string in which the moving window is located, with reference to a second compact table CT2 storing PIDs of the patterns having lengths larger than 4 bytes and less than 8 bytes, and of, when the PID corresponding to the string exists, recording the PID.

Here, the multi-pattern matching algorithm may further include, after the DF moving step, a DF3 checking step of moving the moving window by six bytes from the current position, of converting the string of a length as much as 2 bytes on the moved position into an integer value, and of checking whether or not a bit of a related position in a third direct filter DF3 for patterns having lengths larger than 8 bytes is set to 1.

Here, the multi-pattern matching algorithm may further include, after the DF3 checking step, a PID recording step of, the bit of a related position in the third direct filter DF3 is set to 1, recording a pattern ID (PID) corresponding to the string in which the moving window is located, with reference to a third compact table CT3 storing PIDs of the patterns having lengths larger than 8 bytes.

Here, the multi-pattern matching algorithm may be used in a network intrusion detection system (NIDS).

Another embodiment is a program which is stored in a medium and performs: a moving step of moving a moving window from the start of a string one byte by one byte; a DF1 checking step of converting the string on a current position of the moving window into an integer value, and of checking whether or not a bit of a related position in a first direct filter DF1 for patterns having lengths larger than 2 bytes is set to 1; a DF moving step of moving the moving window to one or more direct filters DF when the bit is set to 1 according to the DF1 checking step; a re-moving step of moving the moving window by one byte again when the bit of a related position in the direct filter DF, which has been checked lastly, is 0; and a terminating step of checking whether the moving window is located at the end of the string or not, and of terminating the algorithm when the moving window is positioned at the end of the string.

Further another embodiment is a multi-pattern matching processing device that includes: a direct filter DF which is a bit array having a plurality of bits, each of which indicates whether two consecutive ASCII codes corresponding to its index belongs to a portion of a particular pattern or not, and is composed of one or more direct filters, each of which has information on $2^n$ (n=0, 1, 2, 3, . . . )-th two bytes of the pattern according to a length of the pattern; and at least one compact table CT which is a structure for recording pattern IDs of the patterns existing in a string and for finding out what pattern exists in the string, and stores the pattern ID according to pattern groups formed based on the length of the pattern.

Here, the direct filter DF may include a first direct filter DF1 including information on the two headmost bytes of all of the patterns, a second direct filter DF2 including information on the second two bytes of the patterns having lengths larger than 4 bytes, a third direct filter DF3 including information on the fourth two bytes of the patterns having lengths larger than 8 bytes, and a fourth direct filter DF4 including information on the two headmost bytes of the patterns having lengths larger than 2 bytes and less than 4 bytes.

Here, the direct filter DF may further include a fifth direct filter DF5 including information on the second two bytes of the patterns having lengths larger than 4 bytes and less than 8 bytes.

Here, the compact table CT may include a first compact table CT1 including the pattern IDs of the patterns having lengths larger than 2 bytes and less than 4 bytes, a second compact table CT2 including the pattern IDs of the patterns having lengths larger than 4 bytes and less than 8 bytes, and a third compact table CT3 including the pattern IDs of the patterns having lengths larger than 8 bytes.

DETAILED DESCRIPTION

A thickness or size of each layer is magnified, omitted or schematically shown for the purpose of convenience and clearness of description. The size of each component does not necessarily mean its actual size.

In description of embodiments of the present invention, when it is mentioned that an element is formed "on" or "under" another element, it means that the mention includes a case where two elements are formed directly contacting with each other or are formed such that at least one separate element is interposed between the two elements. The "on" and "under" will be described to include the upward and downward directions based on one element.

Hereafter, a multi-pattern matching algorithm according to an embodiment of the present invention and a processing apparatus using the same will be described with reference to the drawings.

<Embodiment>

Figure 1:
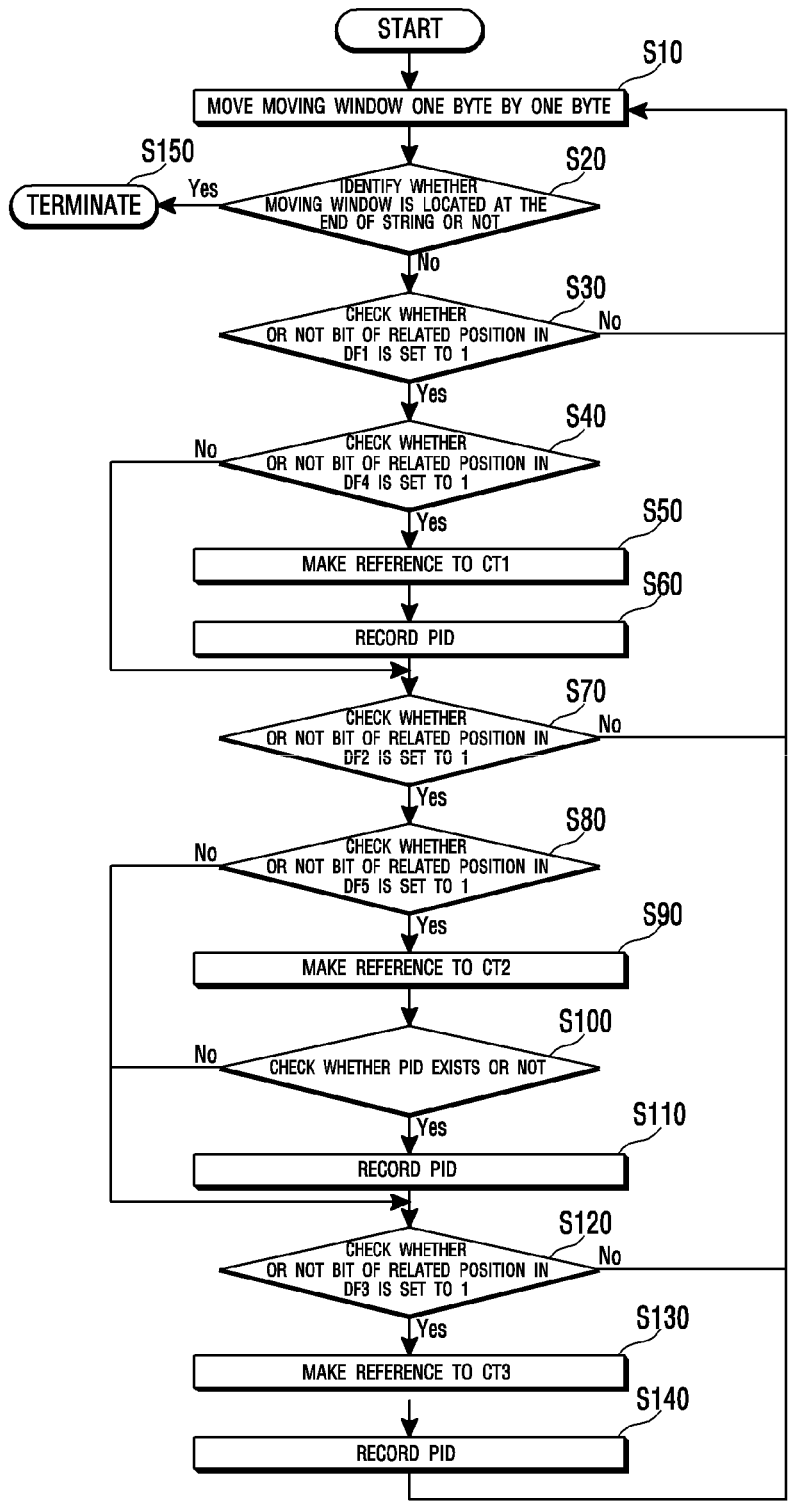
FIG. 1 is a flowchart of a multi-pattern matching algorithm according to an embodiment of the present invention.

FIG. 1 is a flowchart of a multi-pattern matching algorithm according to an embodiment of the present invention.

Referring to FIG. 1, in the multi-pattern matching algorithm according to the embodiment of the present invention, first, a moving window is moved from the start of a string one byte by one byte (S10). For example, the moving window is moved sideways (to the right) from the start of a string one byte by one byte.

Here, the moved moving window identifies the position of the string (S20). If the moved moving window is located at the end of the string, the algorithm is terminated (S150).

Meanwhile, if the moved moving window is not located at the end of the string, the string of a length as much as 2 bytes on the current position of the moving window is converted into an integer value, and it is checked whether or not a bit of a related position in a first direct filter DF1 for patterns having lengths larger than 2 bytes is set to 1 (S30). Here, the string having a length of 2 bytes is just an example and the length of the string is not limited to 2 bytes. Therefore, strings having various lengths can be applied.

Here, when the bit of a related position in the first direct filter DF1 is 0, the step S10 is performed, so that the moving window may be moved by one byte.

Also, when the bit of a related position in the first direct filter DF1 is 1, it is checked whether or not a bit of a related position in a fourth direct filter DF4 is set to 1 in the checked string (S40).

Here, when the bit of a related position in a fourth direct filter DF4 is 0, a below-described step S70 may be performed.

Meanwhile, when the bit of a related position in a fourth direct filter DF4 is 1, a first compact table CT1 is referred (S50). Specifically, an index of the first compact table CT1 is calculated.

A pattern ID (PID) of a pattern corresponding to the string in which the moving window is located is recorded (S60).

The moving window is moved by two bytes from the current position, and then the string of a length as much as 2 bytes on the moved position is converted into an integer value, and it is checked whether or not a bit of a related position in a second direct filter DF2 for patterns having lengths larger than 4 bytes is set to 1 (S70).

Here, when the bit of a related position in the second direct filter DF2 is 0, the step S10 is performed, so that the moving window may be moved by one byte.

Also, when the bit of a related position in the second direct filter DF2 is 1, it is checked whether or not a bit of a related position in a fifth direct filter DF5 for patterns having lengths larger than 4 bytes and less than 8 bytes is set to 1 in the checked string (S80).

Here, when the bit of a related position in the fifth direct filter DF5 is 0, a below-described step S120 may be performed.

Meanwhile, when the bit of a related position in the fifth direct filter DF5 is 1, a second compact table CT2 for patterns having lengths larger than 4 bytes and less than 8 bytes is referred (S90). Specifically, an index of the second compact table CT2 is calculated.

It is checked whether or not a PID corresponding to the string in which the moving window is located exists (S100). When the PID corresponding to the string in which the moving window is located exists, all of the PIDs are recorded (S110).

The moving window is moved by six bytes from the current position, and then the string of a length as much as 2 bytes on the moved position is converted into an integer value, and it is checked whether or not a bit of a related position in a third direct filter DF3 for patterns having lengths larger than 8 bytes is set to 1 (S120).

Here, when the bit of a related position in the third direct filter DF3 is 0, the step S10 is performed, so that the moving window may be moved by one byte.

Meanwhile, when the bit of a related position in the third direct filter DF3 is 1, a third compact table CT3 storing PIDs of patterns having lengths larger than 8 bytes is referred (S130). Specifically, an index of the third compact table CT3 is calculated.

PIDs corresponding to the string in which the moving window is located is recorded (S140). Here, when the PIDs of the corresponding position in the third compact table CT3 are recorded, the step S10 is performed, so that the moving window may be moved by one byte.

Hereafter, the multi-pattern matching algorithm shown in FIG. 1 will be described in detail.

In the multi-pattern matching algorithm according to the embodiment of the present invention, the patterns may be divided into three groups in total on the basis of the length of the pattern.

There are, first, a group comprised of patterns having lengths larger than 2 bytes and less than 4 bytes, a group comprised of patterns having lengths larger than 4 bytes and less than 8 bytes, and lastly, a group comprised of patterns having lengths larger than 8 bytes.

The structures of the compact tables which are used to search each of the pattern groups are slightly different from each other.

Figures 2, 3:
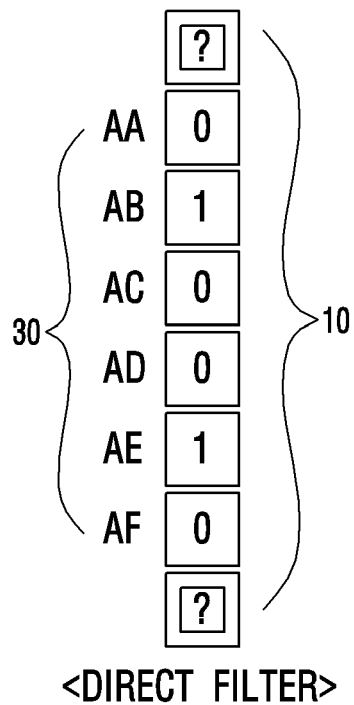
FIG. 2 is a view for describing a direct filter according to the embodiment of the present invention.
FIG. 3 is a view showing an example of a configuration of the pattern.

FIG. 2 is a view for describing the direct filter according to the embodiment of the present invention.

Referring to FIG. 2, the direct filter DF according to the embodiment of the present invention may be a bit array having 65,536 bits 10. Each index 30 of the bit array may consist of two consecutive ASCII codes. Here, the two consecutive ASCII codes is just an example and the number of the ASCII codes is not limited to two. Therefore, one or more consecutive ASCII codes can be applied. Here, the direct filter DF functions as a filter literally. Therefore, the bit of which the index is 0 may be filtered once in advance by the direct filter DF before accessing the below-described compact table CT. Therefore, only the moving windows which has passed through the direct filter DF access the compact table.

At least one direct filter DF may be provided. For example, in the embodiment of the present invention, a total of five direct filters DF1 to DF5 to be described below may be used. Specifically, the first direct filter DF1 is for patterns having lengths larger than 2 bytes, the second direct filter DF 2 is for patterns having lengths larger than 4 bytes, the third direct filter DF 3 is for patterns having lengths larger than 8 bytes, the fourth direct filter DF 4 is for patterns having lengths larger than 2 bytes and less than 4 bytes, and the fifth direct filter DF 5 is for patterns having lengths larger than 4 bytes and less than 8 bytes.

Here, each bit indicates whether two consecutive ASCII codes corresponding to its index belongs to a portion of a particular pattern or not. That is, if the bit is 1, this indicates that when the bit is 1, the ASCII code belongs to a portion of a particular pattern, and when the bit is 0, the ASCII code does not belong to a portion of a particular pattern. For example, if only a pattern of "AA" exists, a bit corresponding to "AA" is set to 1 and all the other bits are reset to 0.

The direct filters DF may be created by mutually different processes.

Specifically, the first direct filter DF1 has information on the two headmost bytes of the patterns having lengths larger than 2 bytes. For example, when it is assumed that there are patterns "UP", "ATTACK", "BOMB" and "EXPLOSION", only the bits corresponding to "UP", "AT", "BO" and "EX" are set to 1 in the corresponding direct filter, and all the other bits are reset to 0.

The second direct filter DF2 has information on the second two bytes of the patterns having lengths larger than 4 bytes. For example, when it is assumed that there are patterns "UP", "ATTACK", "BOMB" and "EXPLOSION", only the bits corresponding to "TA", "MB" and "PL" are set to 1 in the corresponding direct filter, and all the other bits are reset to 0.

The third direct filter DF3 has information on the fourth two bytes of the patterns having lengths larger than 8 bytes. For example, when it is assumed that there are patterns "UP", "ATTACK", "BOMB" and "EXPLOSION", only the bits corresponding to "IO" are set to 1 in the corresponding direct filter, and all the other bits are reset to 0.

The fourth direct filter DF4 has information on the two headmost bytes of the patterns having lengths larger than 2 bytes and less than 4 bytes. For example, when it is assumed that there are patterns "UP", "ATTACK", "BOMB" and "EXPLOSION", only the bits corresponding to "UP" are set to 1 in the corresponding direct filter, and all the other bits are reset to 0.

The fifth direct filter DF5 has information on the two headmost bytes of the patterns having lengths larger than 4 bytes and less than 8 bytes. For example, when it is assumed that there are patterns "UP", "ATTACK", "BOMB" and "EXPLOSION", only the bits corresponding to "TA" and "MB" are set to 1 in the corresponding direct filter, and all the other bits are reset to 0.

Here, the fourth direct filter DF4 is used to calculate the index of the first compact table. Also, the fifth direct filter DF5 is used to improve the performance of the algorithm. That is to say, without the fifth direct filter DF5, the multi-pattern matching algorithm according to the embodiment of the present invention can be operated.

In general, in an intrusion detection system (IDS), an identification (ID) is assigned to each pattern for the convenience of management. The identification (ID) is called a pattern ID (PID) 70. The compact table CT is a structure which stores the PIDs 70, i.e., the IDs of the patterns.

Since only whether a pattern exists or not can be found out through the direct filter DF, it is required to discover the PID 70 of the corresponding pattern in order to find out what pattern is actually included in the string.

The compact table CT is a structure for recording the PIDs 70 of the patterns existing in the string, that is, for At least one compact table CT may be provided. For example, a total of three kinds of compact tables may be used in the multi-pattern matching algorithm according to the embodiment of the present invention. The structures of them are different from each other.

There are, first, a group comprised of patterns having lengths larger than 2 bytes and less than 4 bytes, a group comprised of patterns having lengths larger than 4 bytes and less than 8 bytes, and lastly, a group comprised of patterns having lengths larger than 8 bytes.

Specifically, the first compact table CT1 is for the patterns having lengths larger than 2 bytes and less than 4 bytes. The first compact table CT1 includes only the PIDs 70 of the patterns having lengths larger than 2 bytes and less than 4 bytes. The second compact table CT2 includes only the PIDs 70 of the patterns having lengths larger than 4 bytes and less than 8 bytes. The third compact table CT3 includes only the PIDs of the patterns having lengths larger than 8 bytes.

Hereafter, this will be described with reference to an example.

Figure 4:
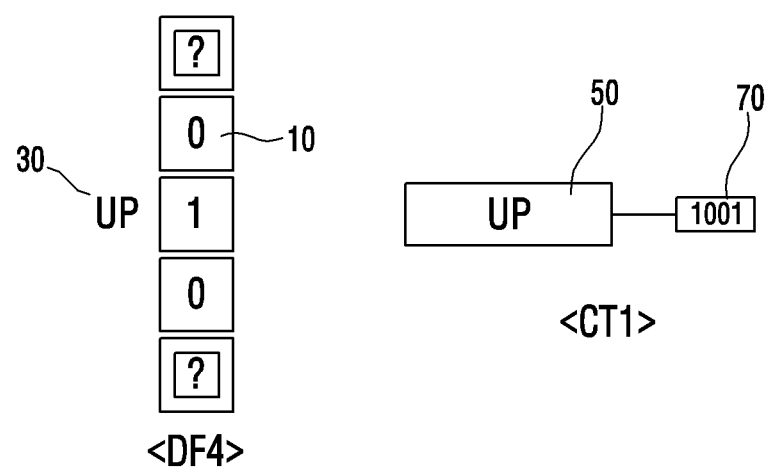
FIG. 4 is a view showing a fourth direct filter and a first compact table for FIG. 3.

FIG. 3 is a view showing an example of a configuration of the pattern. FIG. 4 is a view showing the fourth direct filter DF4 for FIG. 3.

For example, when it is assumed that the pattern has a configuration shown in FIG. 3, the fourth direct filter DF4 and the first compact table CT1 may be shown in FIG. 4. Specifically, the first compact table CT1 may be obtained by counting the number of the bits in the fourth direct filter DF4.

Figure 5:
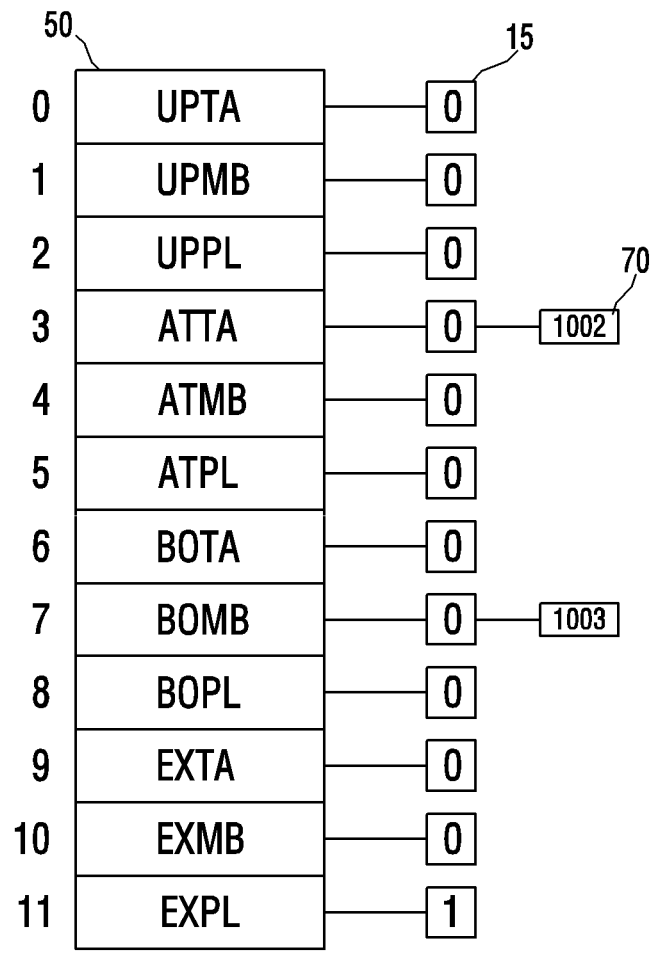
FIG. 5 is a view showing a second compact table for FIG. 3.

FIG. 5 is a view showing the second compact table CT2 for FIG. 3.

The second compact table CT2 may be shown in FIG. 5. Specifically, with regard to the patterns having lengths larger than 4 bytes and less than 8 bytes, in the second compact table CT2, it is checked whether the pattern exists or not by comparing only the four headmost bytes with the string. That is, in a 7-byte pattern, when only the four headmost bytes instead of all seven bytes exist in the string, it is determined that the pattern exists. This intends to improve the performance in spite of increasing the false positive.

In FIG. 5, only "ATTACK" and "BOMB" exist in the patterns having lengths larger than 4 bytes and less than 8 bytes. Therefore, the PID 70 is assigned to only a bucket 50 corresponding to "ATTA" and "BOMB" in the second compact table CT2 and is not assigned to the other buckets 50.

A bit 15 on the right side of each bucket 50 indicates whether the corresponding 4-byte pattern is a part of the pattern having a length larger than 8 bytes or not. For example, in the pattern set taken as an example above, the pattern having a length larger than 8 bytes is only "EXPLOSION". Therefore, only the bit 15 of the bucket 50 corresponding to the bottommost "EXPL" in the compact table CT2 is set to 1, and the bits 15 of all of the other buckets 50 are reset to 0. The bit 15 may be used to determine whether or not to check the third compact table CT3.

Figure 6:
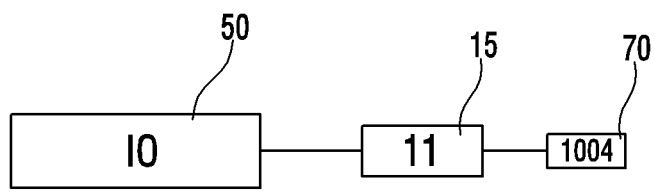
FIG. 6 is a view showing a third compact table for FIG. 3.

FIG. 6 is a view showing the third compact table CT3 for FIG. 3.

The third compact table CT3 may be shown in FIG. 6. Specifically, since the third compact table CT3 includes only the PIDs 70 of patterns having lengths larger than 8 bytes, only the PID 70 "1004" of the pattern "EXPLOSION" exists in the third compact table CT3.

"IO" of the bucket 50 is derived from the fourth two bytes of the pattern "EXPLOSION".

The bit 15 of the bucket 50 corresponding to the "IO" is the index of the second compact table CT2. Since an index 35 of "EXPL", i.e., the four headmost bytes of the pattern "EXPLOSION" is 11 in the second compact table CT2, the bit 15 of the bucket 50 corresponding to "IO" is 11. This intends to process the repetitive pattern.

Figures 7, 8:
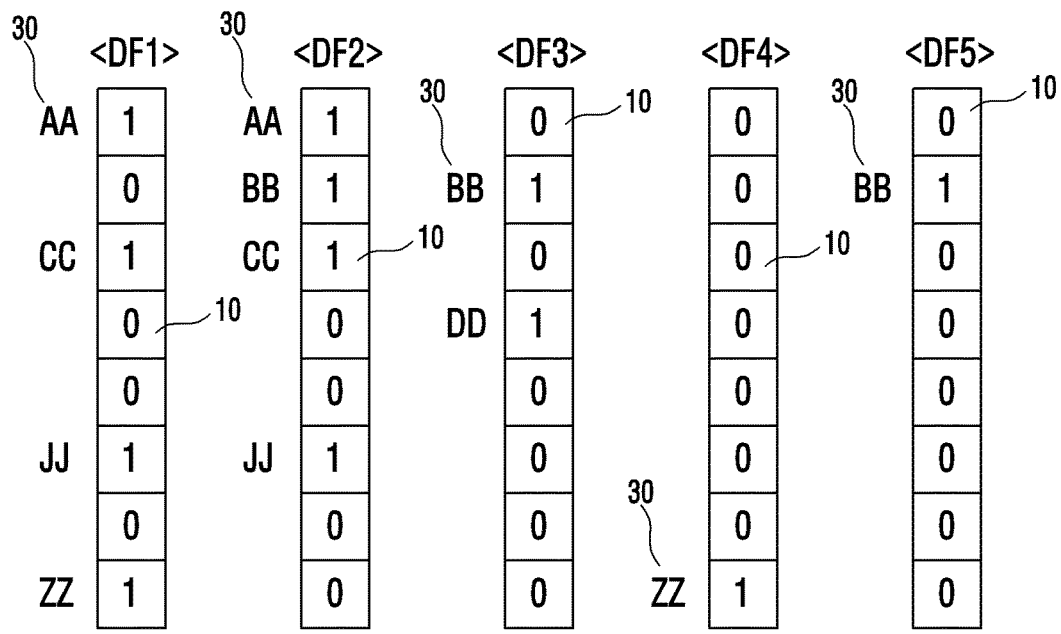
FIG. 7 is a view showing an example of a pattern set for describing the operation of the multi-pattern matching algorithm according to the embodiment of the present invention.
FIG. 8 is a view showing a first to a fifth direct filters for FIG. 7.

FIG. 7 is a view showing an example of a pattern set for describing the operation of the multi-pattern matching algorithm according to the embodiment of the present invention. FIG. 8 is a view showing the first to the fifth compact tables DF1 to DF5 for FIG. 7.

Referring to FIG. 8, the first direct filter DF1 has information on the two headmost bytes of all of the patterns. The second direct filter DF2 has information on the second two bytes of the patterns having lengths larger than 4 bytes. The third direct filter DF3 has information on the fourth two bytes of the patterns having lengths larger than 8 bytes. The fourth direct filter DF4 has information on the two headmost bytes of the patterns having lengths larger than 2 bytes and less than 4 bytes. The fifth direct filter DF5 has information on the second two bytes of the patterns having lengths larger than 4 bytes and less than 8 bytes.

Figure 9:
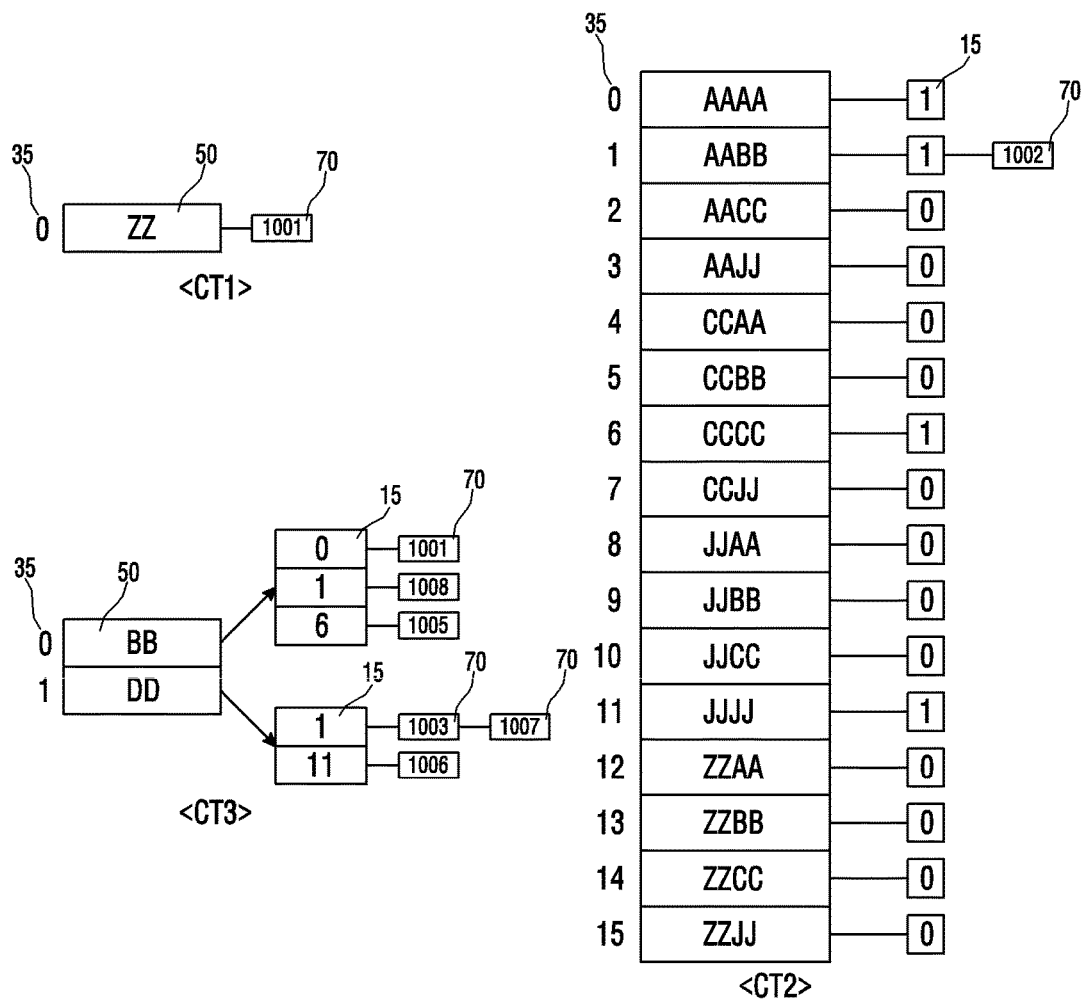
FIG. 9 is a view showing a first to a third compact tables for FIG. 7.

FIG. 9 is a view showing the first to the third compact tables CT1 to CT3 for FIG. 7.

Referring to FIG. 9, the first compact table CT1 includes the PIDs 70 of the patterns having lengths larger than 2 bytes and less than 4 bytes. The second compact table CT2 includes the PIDs 70 of the patterns having lengths larger than 4 bytes and less than 8 bytes. The third compact table CT3 includes the PIDs 70 of the patterns having lengths larger than 8 bytes.

First, referring to <DF4> of FIG. 8 and <CT1> of FIG. 9, the index 35 of the first compact table CT1 can be calculated by counting how many bits are before the corresponding bit in the fourth direct filter DF4. Specifically, it can be seen in the fourth direct filter DF4 that the bit 10 corresponding to the index 30 "ZZ" is 1 which first appears. For this reason, the index 35 in the first compact table CT1 is 0 which first appears.

Referring to <CT2> shown on the right of FIG. 9, since the pattern having a length larger than 4 bytes and less than 8 bytes is only one "AABB" in FIG. 7, only one PID 70 is assigned to the second compact table CT2. Also, since the patterns which have lengths larger than 8 bytes and start from "AAAA", "AABB", "CCCC", and "JJJJ" exist in FIG. 7, the bit 15 of the corresponding bucket 50 is set to 1, and the bits 15 of the other buckets 50 are reset to 0. The index 35 of the second compact table CT2 can be calculated by information on the first direct filter DF1 and the second direct filter DF2. Specifically, the patterns "AAAA" to "ZZJJ" may be listed in order by the information on the index 30 where the bit 10 of the first direct filter DF1 is 1 and the index 30 where the bit 10 of the second direct filter DF2 is 1.

Referring to <CT3> of FIG. 9, regarding the repetitive patterns of FIG. 7, the PIDs 70 of the corresponding patterns are stored in the form of an array. Specifically, since the information on the first, second, and fourth two bytes of the pattern "AABBCCDD" (1003) is consistent with the information on the first, second, and fourth two bytes of the pattern "AABBDDDD" (1007), the PIDs 70 of the two patterns are, as shown in the <CT3> of FIG. 9, stored in one bucket 50 of the third compact table CT3 in the form of an array. Here, the index 35 of the <CT3> of FIG. 9 is calculated by counting the order of the <DF3> of FIG. 8, and the bit 15 of the third compact table CT3 is found out by the index 35 of the second compact table CT2.

Figure 10:
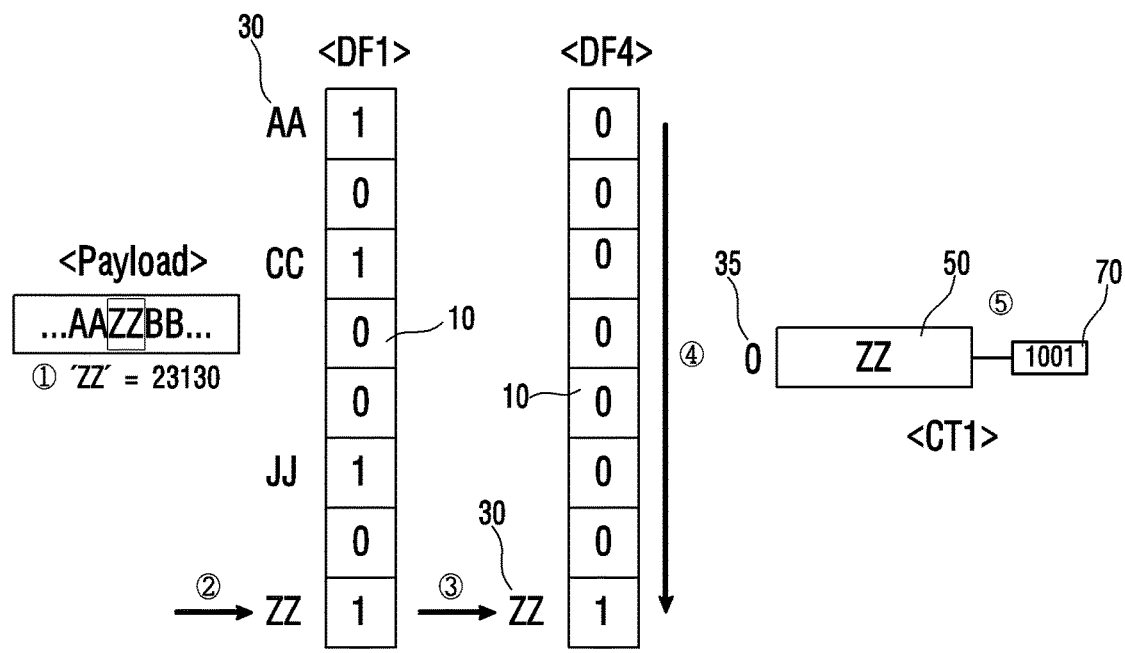
FIG. 10 is a view for describing a process of checking the existence of a 2-byte pattern in FIG. 7.

FIG. 10 is a view for describing a process of checking the existence of a 2-byte pattern in FIG. 7. Here, a payload of a packet shown on the left of FIG. 10 shows a state where the moving window has reached "ZZ" after moving one byte by one byte from the start. Therefore, the PID 70 of "ZZ" should be recorded as "1001".

The process of checking the existence of a 2-byte pattern will be described with reference to FIG. 10. First, ① the index 30 of the first direct filter DF1 is calculated by converting "ZZ" of the payload into a decimal value or an integer value, ② the bit 10 of the corresponding index 30 of the first direct filter DF1 is referred, ③ since the corresponding bit 10 is set to 1, the corresponding bit 10 passes through the first direct filter DF1, ④ the index 35 of the first compact table CT1 is calculated by checking how many 1s are before the 1 of the corresponding bit 10 in the fourth direct filter DF4, and ⑤ the PID 70 "1001" is checked and recorded with reference to the first compact table CT1.

Figure 11:
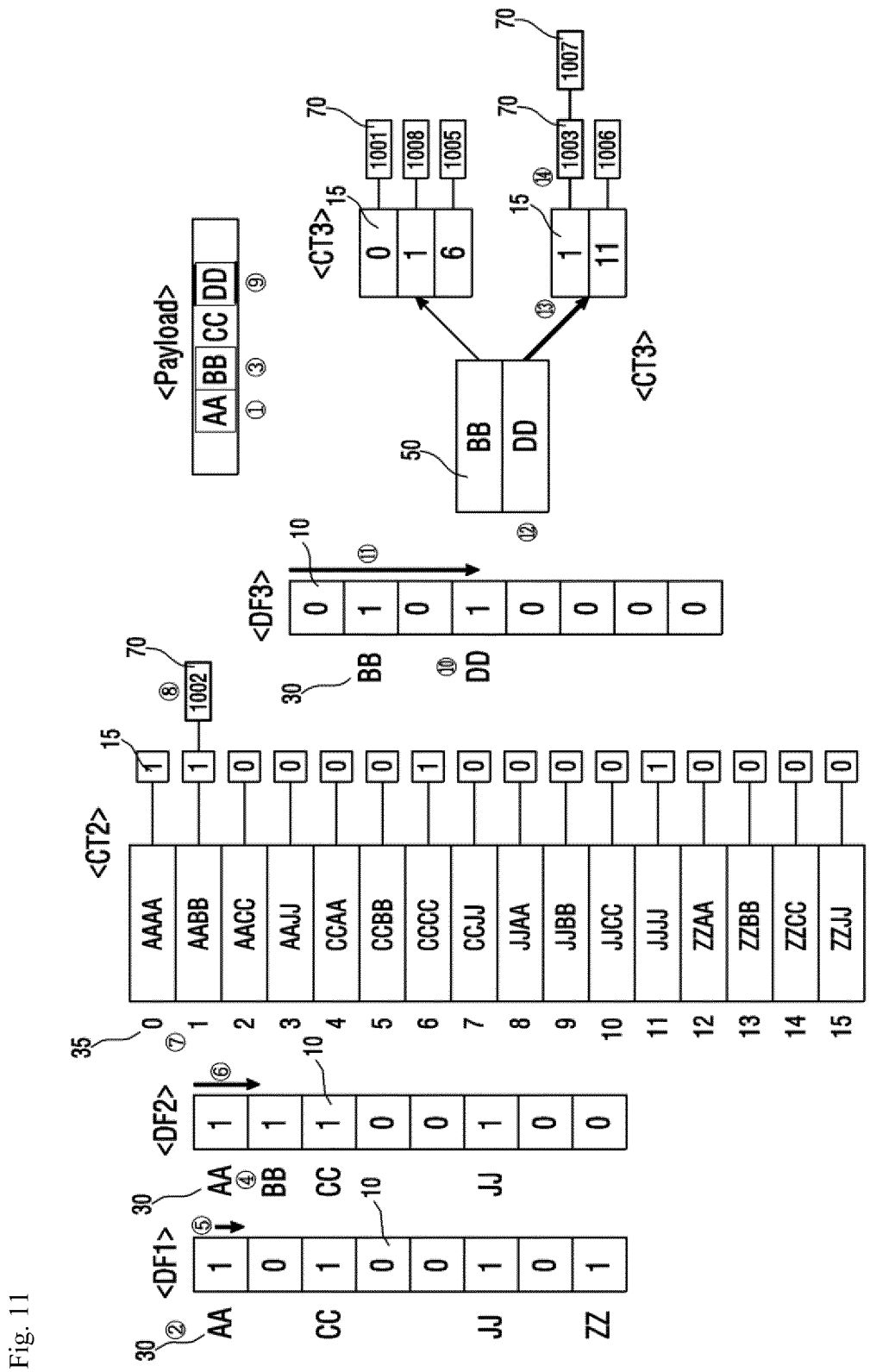
FIG. 11 is a view for describing a process of checking the existence of a 4-byte pattern or an 8-byte pattern in FIG. 7.
Figure 12:
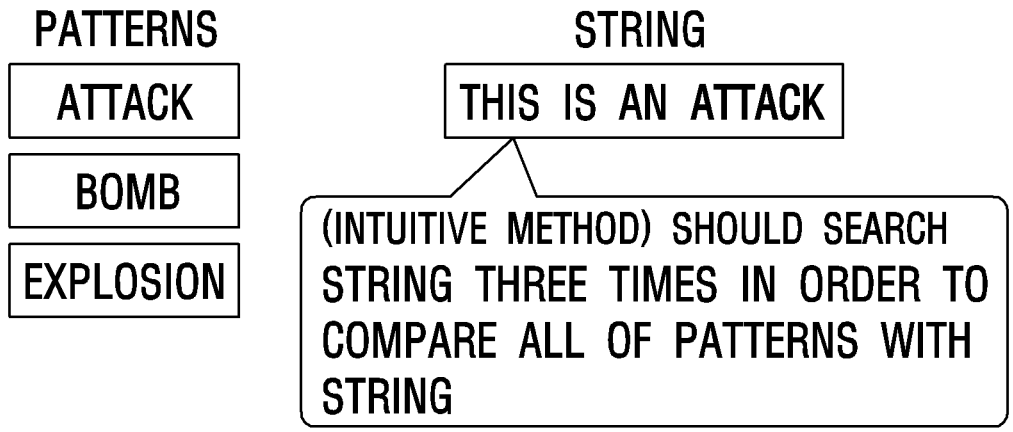
FIG. 12 is a view showing examples of the patterns and strings.
Figure 13:
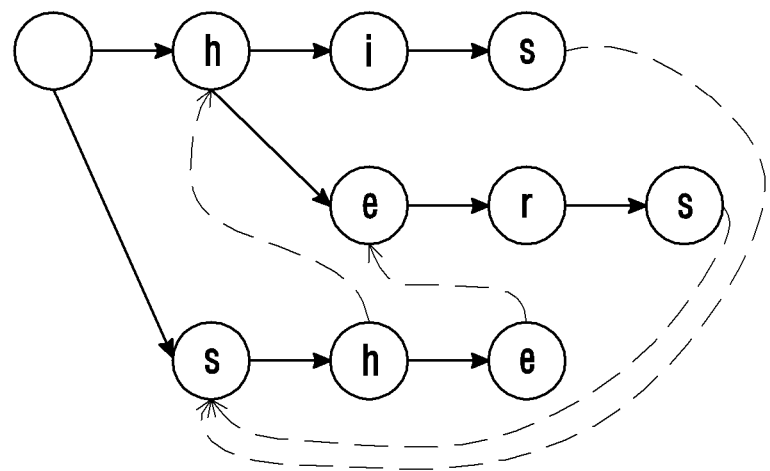
FIG. 13 is a view showing an example of a keyword tree for patterns "his", "hers", "she", "he", and "her".

FIG. 11 is a view for describing a process of checking the existence of a 4-byte pattern or an 8-byte pattern in FIG. 7. Here, since the payload of the packet shown in the top right side of FIG. 11 includes "AABB" and "AABBDD", the PIDs 70 should be recorded as "1002", "1003", and "1007". Hereafter, a process of recording "1002", "1003", and "1007" as the PIDs 70** will be described in a step manner.

A process of checking the existence of a 4-byte pattern or an 8-byte pattern will be described with reference to FIG. 11. First, ① the index 30 of the first direct filter DF1 is calculated by converting "AA" corresponding to a current position of the payload into a decimal value or an integer value, ② the bit 10 of the corresponding index 30 of the first direct filter DF1 is referred, and since the corresponding bit 10 is 1, the corresponding bit 10 passes through the first direct filter DF1, ③ a decimal value or an integer value of "BB", which corresponds to the length of 2 bytes, is calculated at a position to which the moving window of the payload has been moved by two bytes, so that the index 30 of the second direct filter DF2 is obtained, ④ since the corresponding bit 10 of the second direct filter DF2 is 1, the corresponding bit 10 passes through the second direct filter DF2, ⑤ it is checked how many is are before the 1 of the bit 10 corresponding to the index 30 "AA" in the first direct filter DF1 (the first 1), ⑥ it is checked how many is are before the 1 of the bit 10 corresponding to the index 30 "BB" in the second direct filter DF2 (the second 1), ⑦ the index 30 of the second compact table CT2 is calculated by using the values obtained previously in ⑤ and ⑥ (the first 1 and the second 1) (0×4+1=1, here, 0 represents the first 1 in the first direct filter DF1, 4 represents the total number of 1s included in the second direct filter DF2, and 1 represents the second 1 in the second direct filter DF2), ⑧ Since the previously calculated value is 1, the bucket 50 where the index 35 of the second compact table CT2 is 1 is accessed and the PID 70 is recorded, ⑨ since the bit 15 of the bucket 50 where the index 35 of the second compact table CT2 is 1 is set to 1, it can be found that the 8-byte pattern should be also searched for. Therefore, a decimal value or an integer value of "DD", which corresponds to the length of 2 bytes, is calculated at a position to which the moving window of the payload has been further moved by two bytes, so that the index 30 of the third direct filter DF3 is obtained, ⑩ since the corresponding bit 10 of the third direct filter DF3 is 1, the corresponding bit 10 passes through the third direct filter DF3, ⑪ it is checked how many 1s are before the 1 of the bit 10 corresponding to the index 30 "DD" in the third direct filter DF3 (the second 1), ⑫ the bit 15 of the bucket 50 "DD" of the third compact table CT3 is referred, ⑬ it is checked where the value of 1 calculated in ⑦ is in the bit 15, ⑭ since there is the bit 15 corresponding to the calculated value of 1, all of the PIDs 70 in the bit 15 of 1 of the corresponding bucket 50 "DD" are recorded.

The multi-pattern matching algorithm according to the embodiment of the present invention can be used in a network intrusion detection system (NIDS), etc. During the search of a string in the network intrusion detection system, the moving window having a length of 2 bytes moves from the start of the string one byte by one byte and searches. Since most moving windows are filtered by the first direct filter DF1 (since most of the bits 10 of the direct filter DF are reset to 0), only a very small number of moving windows access the compact table CT. Accordingly, most string searches are possible even by only the first one direct filter DF1. The direct filter has a size small enough to be included an L1 cache of a CPU, so that fewer cache misses are caused than that of a conventional algorithm during the search of the string, and consequently, a higher performance can be obtained. Also, the ASCII codes of the patterns are not directly stored in the direct filter or in the compact table, and only a portion of the pattern instead of the entire pattern is stored. Therefore, only a smaller memory space is required than that of a conventional algorithm.

As such, unlike Aho-Corasick algorithm which searches a string for an entire pattern, the multi-pattern matching algorithm according to the embodiment of the present invention which searches a string for only a portion of a pattern, so that a smaller memory space is required.

Also, in the multi-pattern matching algorithm according to the embodiment of the present invention, if it is premised that a string is searched by moving a point from the start to the end of the string one byte by one byte and the point is designated as a window, most of the windows are filtered by a very small direct filter. For this reason, fewer cache misses are caused than that of the conventional Aho-Corasick algorithm, and thus, a higher performance can be obtained.

While the embodiment of the present invention has been described with reference to the accompanying drawings, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A method for multi-pattern matching in a network intrusion detection system (NIDS) including a processor and memory, the method comprising:
   a moving step of moving, by the processor, a moving window from the start of a payload string in a payload of a packet one byte by one byte;
   a DF1 checking step of converting, by the processor, a string on a current position of the moving window into an integer value, and of checking, by the processor, whether or not a bit of a related position in a first direct filter DF1 stored in the memory for patterns having lengths larger than 2 bytes is set to 1;

a DF moving step of checking, by the processor, one or more direct filters DF when the bit is set to 1 according to the DF1 checking step;

a re-moving step of moving, by the processor, the moving window by one byte again when the bit of a related position in a direct filter DF, which has been checked lastly, is 0;

a terminating step of checking, by the processor, whether the moving window is located at the end of the payload string or not, and of terminating the method when the moving window is positioned at the end of the payload string; and a pattern identification step of identifying, by the processor, multiple patterns existing in the payload of the packet based on a bit of a related position in the one or more direct filters DF which is set to 1.

2. The method of claim 1, further comprising, after the DF moving step, a DF4 checking step of checking whether or not a bit of a related position in a fourth direct filter DF4 for patterns having lengths larger than 2 bytes and less than 4 bytes is set to 1.

3. The method of claim 2, further comprising, after the DF4 checking step, a pattern identifier (PID) recording step of, when the bit of a related position in the fourth direct filter DF4 is set to 1, recording a PID corresponding to a string in which the moving window is located, with reference to a first compact table CT1 storing PIDs of the patterns having lengths larger than 2 bytes and less than 4 bytes.

4. The method of claim 1, further comprising, after the DF moving step, a DF2 checking step of moving the moving window by two bytes from a current position, of converting a string of a length as much as 2 bytes on the moved position into an integer value, and of checking whether or not a bit of a related position in a second direct filter DF2 for patterns having lengths larger than 4 bytes is set to 1.

5. The method of claim 4, further comprising, after the DF2 checking step, a DF5 checking step of, when the bit of a related position in the second direct filter DF2 is 1, checking whether or not a bit of a related position in a fifth direct filter DF5 for patterns having lengths larger than 4 bytes and less than 8 bytes is set to 1.

6. The method of claim 5, further comprising, after the DF5 checking step, a pattern identifier (PID) recording step of, when the bit of a related position in the fifth direct filter DF5 is 1, checking whether or not a PID corresponding to a string in which the moving window is located, with reference to a second compact table CT2 storing PIDs of the patterns having lengths larger than 4 bytes and less than 8 bytes, and of, when the PID corresponding to the string exists, recording the PID.

7. The method of claim 1, further comprising, after the DF moving step, a DF3 checking step of moving the moving window by six bytes from a current position, of converting a string of a length as much as 2 bytes on the moved position into an integer value, and of checking whether or not a bit of a related position in a third direct filter DF3 for patterns having lengths larger than 8 bytes is set to 1.

8. The method of claim 7, further comprising, after the DF3 checking step, a pattern identifier (PID) recording step of, the bit of a related position in the third direct filter DF3 is set to 1, recording a PID corresponding to a string in which the moving window is located, with reference to a third compact table CT3 storing PIDs of the patterns having lengths larger than 8 bytes.

9. A non-transitory computer readable storage medium having computer readable program code embodied therein that executes to perform operations in a network intrusion detection system (NIDS), the operations comprising:

a moving step of moving a moving window from the start of a payload string in a payload of a packet one byte by one byte;

a DF1 checking step of converting a string on a current position of the moving window into an integer value, and of checking whether or not a bit of a related position in a first direct filter DF1 for patterns having lengths larger than 2 bytes is set to 1;

a DF moving step of moving the moving window to one or more direct filters DF when the bit is set to 1 according to the DF1 checking step;

a re-moving step of moving the moving window by one byte again when the bit of a related position in a direct filter DF, which has been checked lastly, is 0;

a terminating step of checking whether the moving window is located at the end of the payload string or not, and of terminating the operation when the moving window is positioned at the end of the payload string; and a pattern identification step of identifying multiple patterns existing in the payload of the packet based on a bit of a related position in the one or more direct filters DF which is set to 1.

10. An apparatus for multi-pattern matching in a network intrusion detection system (NIDS), comprising:

a processor; and memory storing a direct filter DF and at least one compact table CT, wherein the direct filter DF is a bit array having a plurality of bits, each of which indicates whether one or more consecutive ASCII codes corresponding to its index belongs to a portion of a particular pattern or not, and is composed of one or more direct filters, each of which has information on $2^n$ ($n=0, 1, 2, 3, \ldots$)-th two bytes of a pattern according to a length of the pattern, wherein the processor is configured to:

record, in the at least one compact table CT, pattern identifiers (PIDs) of patterns existing in a payload string in a payload of a packet, form pattern groups based on a length of a first pattern, store a (PID) in the memory according to the pattern groups formed based on the length of the first pattern, and identify multiple patterns existing in the payload of the packet based on PIDs stored in the memory.

11. The apparatus of claim 10, wherein the direct filter DF comprises a first direct filter DF1, a second direct filter DF2, a third direct filter DF3, and a fourth direct filter DF4, the first direct filter DF1 comprises information on two headmost bytes of a plurality of patterns, the second direct filter DF2 comprises information on second two bytes of patterns having lengths larger than 4 bytes among the plurality of patterns, the third direct filter DF3 comprises information on fourth two bytes of patterns having lengths larger than 8 bytes among the plurality of patterns, and fourth direct filter DF4 comprises information on two headmost bytes of patterns having lengths larger than 2 bytes and less than 4 bytes among the plurality of patterns.

12. The apparatus of claim 11, wherein the direct filter DF further comprises a fifth direct filter DF5, and the fifth direct filter DF5 comprises information on second two bytes of patterns having lengths larger than 4 bytes and less than 8 bytes among the plurality of patterns.

13. The apparatus of claim 10, wherein the compact table CT comprises a first compact table CT1, a second compact table CT2, and a third compact table CT1, the first compact table CT1 comprises pattern IDs of patterns having lengths larger than 2 bytes and less than 4 bytes, the second compact table CT2 comprises pattern IDs of patterns having lengths larger than 4 bytes and less than 8 bytes, and the third compact table CT3 comprises pattern IDs of patterns having lengths larger than 8 bytes.

* * * * *